United States Patent
Hariram et al.

(10) Patent No.: US 9,517,830 B2
(45) Date of Patent: Dec. 13, 2016

(54) SEAL DESIGN FOR VEHICLE AND STRUCTURE APPLICATION

(71) Applicant: The Boeing Company, Chicago, IL (US)

(72) Inventors: Sham S. Hariram, Seattle, WA (US); Paul B. Philipp, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/217,673

(22) Filed: Mar. 18, 2014

(65) Prior Publication Data

US 2015/0266561 A1 Sep. 24, 2015

(51) Int. Cl.
| | |
|---|---|
| *B64C 1/14* | (2006.01) |
| *E06B 7/16* | (2006.01) |
| *B64C 1/06* | (2006.01) |
| *F16J 15/10* | (2006.01) |
| *F16J 15/12* | (2006.01) |

(52) U.S. Cl.
CPC .............. *B64C 1/1407* (2013.01); *B60J 10/24* (2016.02); *B60J 10/38* (2016.02); *B64C 1/066* (2013.01); *F16J 15/104* (2013.01); *F16J 15/121* (2013.01); *E06B 7/16* (2013.01)

(58) Field of Classification Search
CPC .... B64C 1/1407; B64C 1/1461; B64C 1/1446; B64C 1/1423; E06B 7/16; B60J 10/38; B60J 10/24; B60J 10/84; B60J 10/86; B60J 10/80; B60J 10/248
USPC ....................... 49/475.1, 478.1, 483.1, 484.1, 495.1, 49/498.1, 499.1; 244/129.4, 129.5
See application file for complete search history.

(56) References Cited

U.S. PATENT DOCUMENTS

| | | | | |
|---|---|---|---|---|
| 2,104,144 A | * | 1/1938 | Zand ........................ | 244/129.5 |
| 2,899,256 A | * | 8/1959 | Kelly .................... | F25D 23/082 |
| | | | | 312/296 |
| 3,215,442 A | * | 11/1965 | Papenguth .................... | 277/611 |

(Continued)

FOREIGN PATENT DOCUMENTS

| | | |
|---|---|---|
| EP | 1847735 A1 | 10/2007 |
| WO | 2014120310 A2 | 8/2014 |

OTHER PUBLICATIONS

"ParkerStore, Your hydraulic and pneumatic solutions and services", Parker Hannifin Europe Sarl, 2012; Retrieved from the Internet: <http://www.parker.com/literature/Corporate%20EMEA/ParkerStore%20catalogue%202012/ParkerStore%20catalogue%202012_EN.pdf>, Accessed on Mar. 12, 2014, 620 pgs.

(Continued)

*Primary Examiner* — Justin Rephann
(74) *Attorney, Agent, or Firm* — Kwan & Olynick LLP

(57) ABSTRACT

Provided is a captured seal assembly that can be positioned between a first surface and a second surface of a structure or vehicle, such as an aircraft. The captured seal assembly includes a geometric-shaped seal such as a bulb-shaped seal that can be secured to an outer perimeter of the first surface and a receiving land capture that can be secured to an outer perimeter of the second surface. The geometric-shaped seal is designed to engage with the receiving land capture, and join the first surface and second surface when the geometric-shaped seal is engaged with the receiving land capture. In addition, the seal assembly can maintain a differential in pressure between a first region adjacent to the first surface and a second region adjacent to the second surface.

18 Claims, 7 Drawing Sheets

(56) References Cited

U.S. PATENT DOCUMENTS

| | | | | |
|---|---|---|---|---|
| 3,400,964 | A | * | 9/1968 | Baermann .................. 292/251.5 |
| 3,531,133 | A | * | 9/1970 | Gulick et al. ................. 277/611 |
| 4,312,153 | A | * | 1/1982 | Parkinson et al. ........... 49/496.1 |
| 4,999,951 | A | * | 3/1991 | Keys et al. ................... 49/478.1 |
| 5,052,152 | A | * | 10/1991 | Weddendorf ................ 49/495.1 |
| 5,282,338 | A | * | 2/1994 | Oliver .......................... 49/476.1 |
| 5,355,628 | A | * | 10/1994 | Dranchak .................... 49/483.1 |
| 5,899,463 | A | * | 5/1999 | Koch ............................ 277/634 |
| 6,189,833 | B1 | * | 2/2001 | Ambrose et al. ........... 244/129.5 |
| 6,273,433 | B1 | * | 8/2001 | Yu ................................ 277/629 |
| 6,401,398 | B1 | * | 6/2002 | Panayides et al. .......... 49/498.1 |
| 6,460,859 | B1 | | 10/2002 | Hammi et al. |
| 6,487,819 | B1 | * | 12/2002 | Goldberg et al. ............ 49/478.1 |
| 6,598,883 | B1 | * | 7/2003 | Hammi et al. ................ 277/596 |
| 6,601,345 | B2 | * | 8/2003 | Nozaki .................. B60J 10/042 |
| | | | | 49/483.1 |
| 7,125,067 | B2 | * | 10/2006 | Bonnett ................ B60J 5/0416 |
| | | | | 296/146.5 |
| 7,185,941 | B2 | * | 3/2007 | Klein et al. ................... 296/121 |
| 7,594,359 | B2 | * | 9/2009 | Keefe et al. ................. 49/498.1 |
| 7,661,680 | B2 | * | 2/2010 | Langberg ...................... 277/629 |
| 8,397,431 | B2 | * | 3/2013 | Krahl ............................. 49/141 |
| 8,492,660 | B2 | * | 7/2013 | Carducci et al. ............. 174/364 |
| 8,684,216 | B2 | * | 4/2014 | Tachibana ..................... 220/327 |
| 2005/0200526 | A1 | * | 9/2005 | Crain et al. ............ 343/700 MS |
| 2005/0247823 | A1 | * | 11/2005 | Wood et al. ................. 244/129.5 |
| 2007/0113482 | A1 | * | 5/2007 | Dumke et al. ............... 49/498.1 |
| 2008/0164373 | A1 | * | 7/2008 | Roming ...................... 244/129.5 |
| 2008/0277530 | A1 | * | 11/2008 | Kyle et al. .................. 244/129.5 |
| 2008/0298887 | A1 | * | 12/2008 | Rudduck et al. ............. 403/384 |
| 2009/0166473 | A1 | * | 7/2009 | Zuniga Sagredo ........ 244/129.4 |
| 2009/0255187 | A1 | * | 10/2009 | Alexander et al. .......... 49/477.1 |
| 2009/0294591 | A1 | * | 12/2009 | Ramirez Blanco |
| | | | | et al. .......................... 244/129.4 |
| 2012/0097794 | A1 | * | 4/2012 | Fort et al. .................. 244/129.4 |
| 2012/0187247 | A1 | * | 7/2012 | Delgado Jareno |
| | | | | et al. .......................... 244/129.5 |
| 2013/0062352 | A1 | * | 3/2013 | Tachibana ..................... 220/378 |
| 2014/0262358 | A1 | * | 9/2014 | Livingston et al. ............ 169/45 |
| 2014/0345199 | A1 | * | 11/2014 | Yahata et al. ................ 49/475.1 |

OTHER PUBLICATIONS

Application Serial No. GB1502981.2, Search and Examination Report mailed Jul. 27, 2015, 6 pgs.

\* cited by examiner

SEAL DESIGN FOR VEHICLE AND STRUCTURE APPLICATION

TECHNICAL FIELD

The present disclosure relates to a seal design for vehicle and structure application.

BACKGROUND

Various features of vehicles and structures require sealing from the external and or internal atmosphere in order to prevent leakage, or to form a fire seal. In particular, vehicles such as airplanes may require sealing from the outside environment or between various sections of the aircraft. Numerous airplane joints at nacelles, pylons, access doors, panels, etc., require the use of seals to prevent elements from entering and exiting an area through the joints. Any gaps in the seals may affect performance of an aircraft and its components. Additionally, effective seals can act as fire seals and can also form a part of a fire wall.

Within an airplane, engine nacelles, auxiliary power units (APUs), and cargo doors have joints or openings that need to be sealed. Gaskets, such as a strip or ring of rubber can be used to seal these areas in some instances. In other instances, shaped material such as a bulb seal can be used to seal these areas. According to current practices, every seal is custom made for the particular application and seal configurations on all engine nacelle fire zone applications must be fire tested and be fire proof or fire resistant.

Providing custom seals for each use in an airplane or other vehicle or structure is costly and time-consuming. In addition, conducting fire tests of each of these custom seals is expensive and inefficient. Accordingly, it is desirable to provide improved seal designs that can improve efficiency, reduce costs, and effectively prevent leakage.

SUMMARY

Provided are mechanisms for a captured seal design for vehicles and structures and processes for implementing the captured seal design.

In one aspect, a mechanism including a captured seal assembly is provided. The captured seal assembly is positioned between a first surface and a second surface of a structure or vehicle, such as an aircraft. The captured seal assembly includes a geometric-shaped seal that can be secured to an outer perimeter of the first surface and a receiving land capture that can be secured to an outer perimeter of the second surface. The geometric-shaped seal engages with the receiving land capture, and joins the first surface and second surface when the geometric-shaped seal is engaged with the receiving land capture. In addition, the captured seal assembly can maintain a differential in pressure between a first region adjacent to the first surface and a second region adjacent to the second surface.

In one aspect, which may include at least a portion of the subject matter of any of the preceding and/or following examples and aspects, the first surface is a first aircraft surface and the second surface is a second aircraft surface.

In one aspect, which may include at least a portion of the subject matter of any of the preceding and/or following examples and aspects, the first aircraft surface is a door and the second aircraft surface includes an opening that is designed to be covered by the door.

In one aspect, which may include at least a portion of the subject matter of any of the preceding and/or following examples and aspects, the receiving land capture engages two sides of the geometric-shaped seal. The geometric-shaped seal may be a bulb-shaped seal.

In one aspect, which may include at least a portion of the subject matter of any of the preceding and/or following examples and aspects, the receiving land engages a first side of the geometric-shaped seal while a second side of the geometric-shaped seal does not engage the receiving land capture, and wherein the first side of the geometric-shaped seal is opposite to the second side of the geometric-shaped seal.

In one aspect, which may include at least a portion of the subject matter of any of the preceding and/or following examples and aspects, the geometric-shaped seal includes a magnetic material that can magnetically attract to the receiving land capture.

In one aspect, which may include at least a portion of the subject matter of any of the preceding and/or following examples and aspects, the geometric-shaped seal includes a reinforcement layer made of ceramic fiber, glass fiber, metal, magnetic material or non-metallic material.

In one aspect, which may include at least a portion of the subject matter of any of the preceding and/or following examples and aspects, the geometric-shaped seal includes a stiffening material that forms an outside surface of the geometric-shaped seal.

In one aspect, which may include at least a portion of the subject matter of any of the preceding and/or following examples and aspects, the geometric-shaped seal includes a stiffening material that is embedded in the geometric-shaped seal.

In one aspect, which may include at least a portion of the subject matter of any of the preceding and/or following examples and aspects, the receiving land capture is made of a ferritic material, stainless steel, aluminum, magnetic material or non-metallic material.

In one aspect, a captured seal assembly is provided, which includes a geometric-shaped seal that can be secured to an outer perimeter of a first surface and a receiving land capture that can be secured to an outer perimeter of a second surface. The geometric-shaped seal engages with the receiving land capture. When the geometric-shaped seal is engaged with the receiving land capture, the first surface and second surface are joined and a differential in pressure between a first region adjacent to the first surface and a second region adjacent to the second surface can be maintained.

In one aspect, which may include at least a portion of the subject matter of any of the preceding and/or following examples and aspects, the first surface is a first aircraft surface and the second surface is a second aircraft surface.

In one aspect, which may include at least a portion of the subject matter of any of the preceding and/or following examples and aspects, the receiving land capture engages two sides of the geometric-shaped seal.

In one aspect, which may include at least a portion of the subject matter of any of the preceding and/or following examples and aspects, the receiving land capture engages one side of the geometric-shaped seal. The geometric-shaped seal may be a bulb-shaped seal.

In one aspect, which may include at least a portion of the subject matter of any of the preceding and/or following examples and aspects, geometric-shaped seal includes a magnetic material that magnetically attracts the receiving land capture.

In one aspect, which may include at least a portion of the subject matter of any of the preceding and/or following examples and aspects, the geometric-shaped seal includes a reinforcement layer made of ceramic fiber, glass fiber, metal, magnetic material or non-metallic material.

In one aspect, which may include at least a portion of the subject matter of any of the preceding and/or following examples and aspects, the geometric-shaped seal can be disengaged from the receiving land capture by applying a force normal to the first surface.

In one aspect, method is provided for installing a captured seal assembly between two surfaces of an aircraft. A geometric-shaped seal is secured to an outer perimeter of a first surface of the aircraft and a receiving land capture is placed on a corresponding outer perimeter of a second surface of the aircraft. The geometric-shaped seal is engaged with the receiving land capture to secure the first surface to the second surface and maintain a pressure differential across an assembly comprising the geometric-shaped seal engaged with the receiving land capture.

In one aspect, which may include at least a portion of the subject matter of any of the preceding and/or following examples and aspects, the second surface includes an opening, and the first surface is designed to cover the opening.

In one aspect, which may include at least a portion of the subject matter of any of the preceding and/or following examples and aspects, the first surface includes an opening, and the second surface is designed to cover the opening. The geometric-shaped seal may be a bulb-shaped seal.

In various embodiments, the captured seal may include a variety of materials and structures and may be captured, magnetic, or otherwise engaged. Captured seal materials may include nitrile rubber, fluorocarbon rubber, polyurethane, ceramics, silicone, ceramics, nylon, alloys, polymers, and the like. A captured seal structure may be bulb-shaped, triangular-shaped, wedge-shaped, cone-shaped, tear-drop shaped, rectangular-shaped and the like.

The particular embodiments that have been discussed can be achieved independently in various embodiments of the disclosure or may be combined in yet other embodiments further details of which can be seen with reference to the following description and drawings.

DETAILED DESCRIPTION OF EXAMPLE EMBODIMENTS

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Various concepts presented relate to apparatus and methods for a captured seal design for vehicles and structures. In particular, various concepts presented herein relate to improved sealing techniques such as more effective contact with seal lands, inclusion of embedded magnetic materials, captive and semi-captive seal lands, and other features. According to various embodiments, a captured seal design can be used for aircraft joints, panels, and other structures.

In particular embodiments, a captured seal assembly includes a geometric-shaped seal such as a bulb-shaped, cone-shaped, wedge-shaped, or tear-drop shaped seal that engages with a land capture. The seal may or may not be resilient. This seal assembly can produce a more effective and secure seal than previous designs that include only a gasket or seal, without a land capture or a capture seal. By using a fixed land capture in various examples presented herein, the heavy burden of maintenance and seal issues in the shop can be reduced or eliminated. In addition, using the geometric-shaped seal with the land capture can provide superior fire seals. It should be noted that although one example of a geometric-shaped seal in the form of a geometric-shaped seal is described for illustrative purposes, various embodiments should not be limited to a particular geometric-shaped seal and should include a variety of other geometries.

With current designs, engine nacelle applications are fire tested because there is no standard design. Because every seal is custom made for the particular application, each seal must undergo fire testing, which is an expensive certification process. According to various embodiments, the seal assembly described can be tested and certification data can be generated for the design. Once the seal assembly is certified, this assembly may be implemented without additional certification fire testing, which is an expensive process. The seal assembly can then be accepted and used based on its proven design in standard applications. In particular, the seal assembly can be standardized and made available for use by others in the aircraft industry.

Seal Assembly

Figure 1:
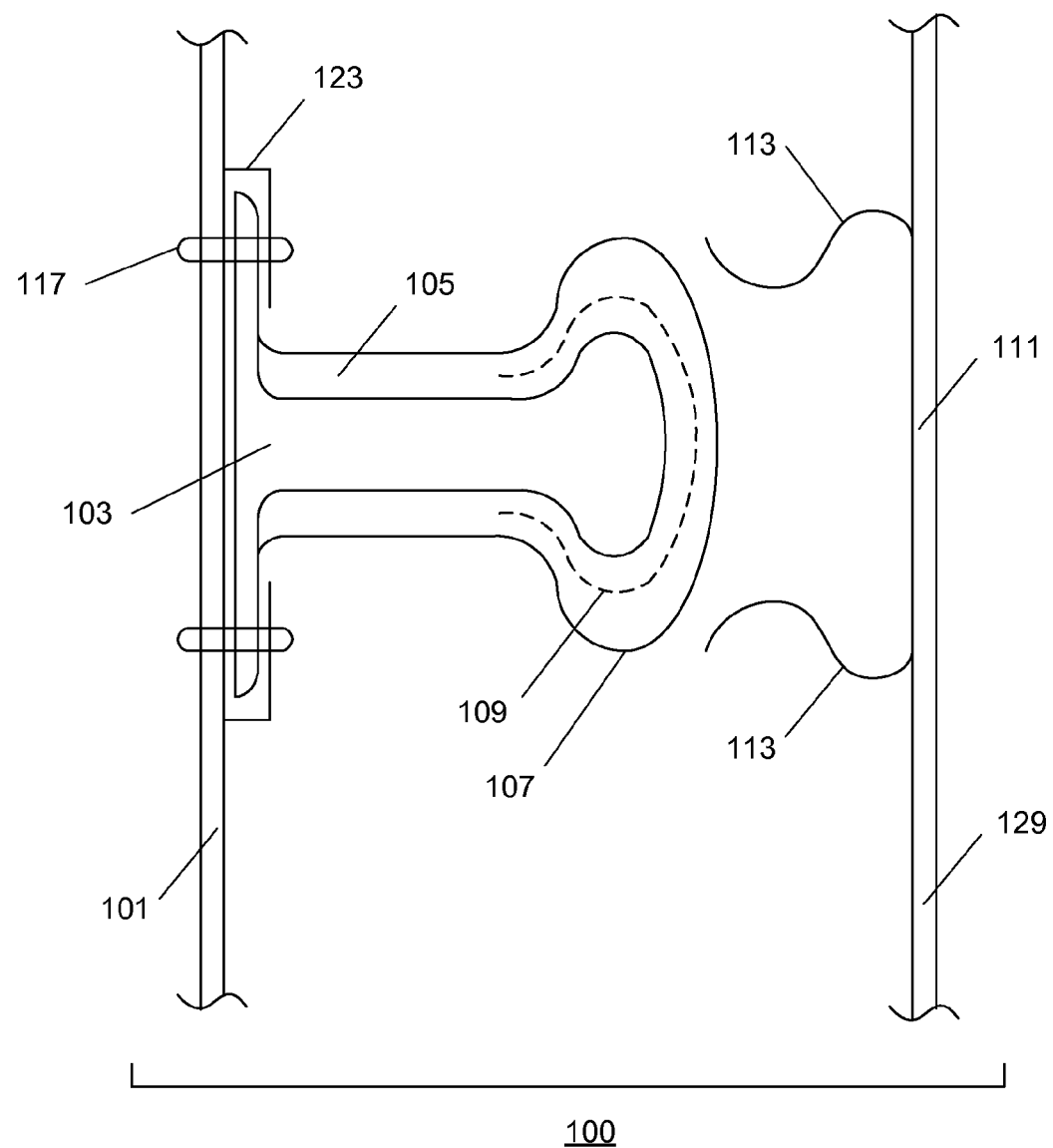
FIG. 1 is a cross-sectional view of a captured seal assembly, in accordance with various embodiments.

According to various embodiments, a seal assembly can be used to join two surfaces of a vehicle or structure, such that leakage between the surfaces is reduced. With reference to FIG. 1, shown is a cross-sectional view of a seal assembly, in accordance with various embodiments. As shown, the seal assembly 100 includes a bulb-shaped seal and a receiving land capture. It should be recognized that although a particular seal geometry is described, a variety of different geometric-shaped seal seal structures can be used including bulb-shaped seals, triangular-shaped seals, cone-shaped seals, and wedge-shaped seals. In the present embodiment, the bulb-shaped seal includes bulb core 103, reinforcement layer 105, stiffening layer 107, and an optional embedded layer 109. According to particular embodiments, the bulb-shaped seal is configured to elastically deform such that it can engage with a receiving land capture 113 and form a snug, secure fit. In some examples, bulb core 103 can be hollow, and in other instances, bulb core 103 may include a closed cell rubber or silicone core or other materials. Reinforcement layer 105 can include materials such as ceramic fiber, glass fiber, metal, magnetic material or other non-metallic materials. Stiffening layer 107 can include a metal or non-metallic material that provides stiffness for engaging with a receiving land capture 113. This stiffening layer 107 can cover the reinforcement layer 105 in various embodiments, and can be embedded within reinforcement layer 105 in other embodiments, depending on the application. In some examples, stiffening layer 107 may also include magnetic materials configured to attract and bond to the receiving land capture 113.

In the present embodiment, embedded layer 109 can be optionally included in some examples. For instance, embedded layer 109 can include a magnetic material that is configured to attract and bond to the receiving land capture 113 when the bulb-shaped seal is engaged with the receiving land capture 113. By including a magnetic material within or covering the bulb-shaped seal, the bond between the bulb-shaped seal and the receiving land capture 113 can be improved and leakage can be reduced. In addition, receiving land capture 113 can be made of magnetic materials in some examples.

In the present embodiment, the bulb-shaped seal can be secured to the surface of an aircraft panel 101. For example, the bulb-shaped seal can be secured using a bracket 123 and fastener 117, or any other mechanism configured to attach the bulb-shaped seal to the surface of aircraft panel 101. As shown, the bulb-shaped seal is configured to engage with receiving land capture 113, such that when the bulb-shaped seal and the receiving land capture are engaged, aircraft panel 101 is secured to aircraft panel 129.

According to various embodiments, land 111 is a location where the bulb-shaped seal makes contact with the surface of aircraft panel 129. In some examples, land 111 can be made of a magnetic material. In the present embodiment, the bulb-shaped seal engages with receiving land capture 113, which is fixed to aircraft panel 129. Receiving land capture 113 is configured to mechanically hold the bulb-shaped seal in place when engaged with the receiving land capture 113. In addition, receiving land capture 113 can be made of a ferritic material, stainless steel, aluminum, magnetic material, non-metallic materials, or other materials. In some examples, land capture 113 can include a magnetic material designed to attract materials included in the bulb-shaped seal. According to various examples, receiving land capture 113 is configured to elastically deform to allow the bulb-shaped seal to engage with receiving land capture 113, such that receiving land capture 113 can open to allow placement of the bulb-shaped seal and return substantially to its original shape to secure the bulb-shaped seal in place. According to various embodiments, in order to disengage the bulb-shaped seal from the receiving land capture 113, a force can be applied normal to the surfaces of aircraft panels 101 and/or 129 such that the bulb-shaped seal is pulled apart and released from the receiving land capture 113.

Figure 2:
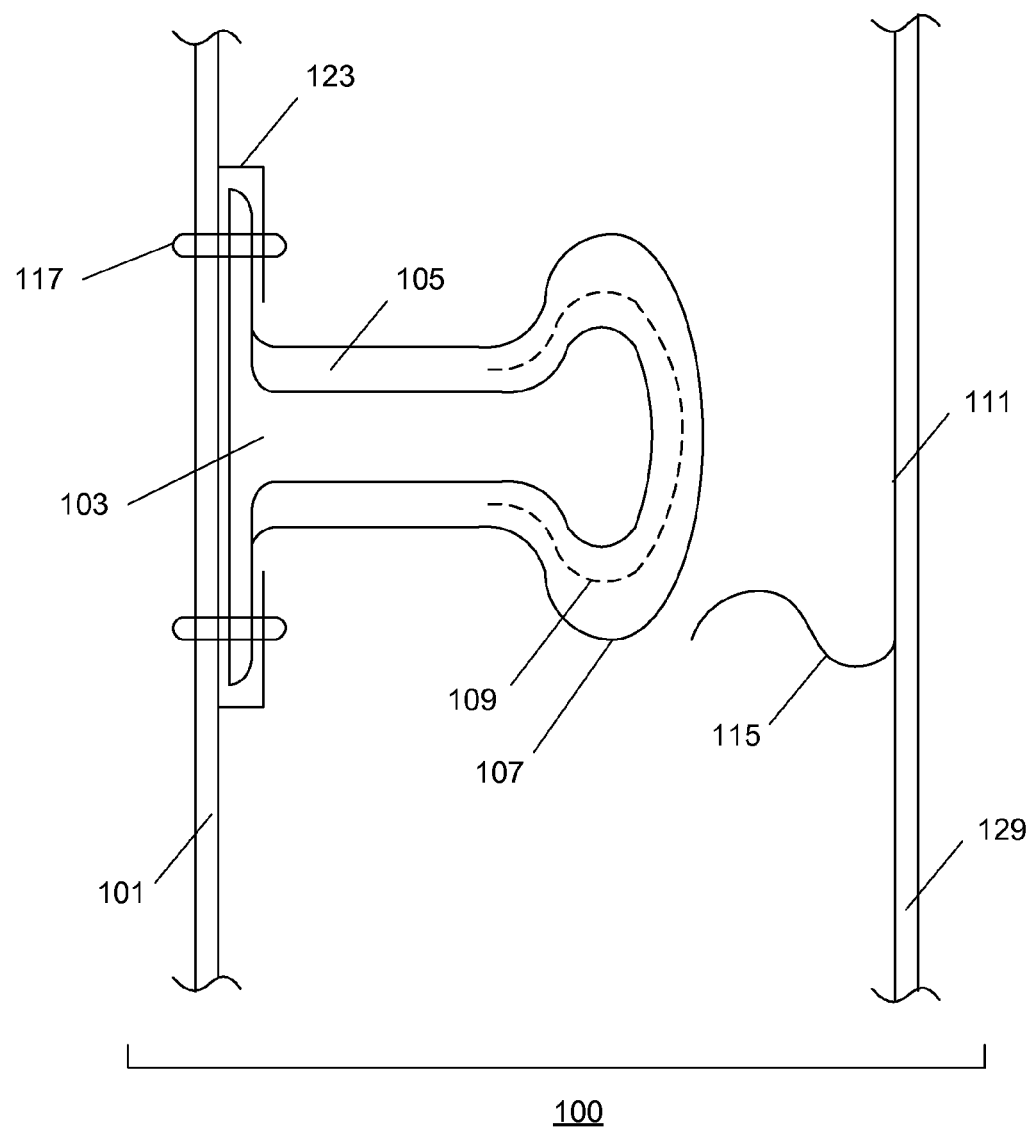
FIG. 2 is a cross-sectional view of a captured seal assembly with a one-sided capture seal, in accordance with various embodiments.

With reference to FIG. 2, shown is a cross-sectional view of a captured seal assembly with a one-sided capture seal, in accordance with various embodiments. As shown, the captured seal assembly 100 includes bulb-shaped seal and a receiving land capture. In the present embodiment, the bulb-shaped seal includes bulb core 103, reinforcement layer 105, stiffening layer 107, and an optional embedded layer 109. According to particular embodiments, the bulb-shaped seal is configured to elastically deform such that it can engage with a receiving land capture 115 and form a snug, secure fit. In some examples, bulb core 103 can be hollow, and in other instances, bulb core 103 may include a closed cell rubber or silicone core or other materials. Reinforcement layer 105 can include materials such as ceramic fiber, glass fiber, metal, magnetic material or other non-metallic materials. Stiffening layer 107 can include a metal or non-metallic material that provides stiffness for engaging with a receiving land capture 115. This stiffening layer 107 can cover the reinforcement layer 105 in various embodiments, and can be embedded within reinforcement layer 105 in other embodiments, depending on the application. In some examples, stiffening layer may also include magnetic materials configured to attract and bond to the receiving land capture 115.

In the present embodiment, embedded layer 109 can be optionally included in some examples. For instance, embedded layer 109 can include a magnetic material that is configured to attract and bond to the receiving land capture 115 when the bulb-shaped seal is engaged with the receiving land capture 115. By including a magnetic material within or covering the bulb-shaped seal, the bond between the bulb-shaped seal and the receiving land capture 115 can be improved and leakage can be reduced.

In the present embodiment, the bulb-shaped seal can be secured to the surface of an aircraft panel 101. For example, the bulb-shaped seal can be secured using a bracket 123 and fastener 117, or any other mechanism configured to attach the bulb-shaped seal to the surface of aircraft panel 101. As shown, the bulb-shaped seal is configured to engage with receiving land capture 115, such that when the bulb-shaped seal and the receiving land capture are engaged, aircraft panel 101 is secured to aircraft panel 129.

According to various embodiments, land 111 is a location where the bulb-shaped seal makes contact with the surface of aircraft panel 129. In some examples, land 111 can be made of a magnetic material. In the present embodiment, the bulb-shaped seal engages with receiving land capture 115, which is fixed to aircraft panel 129. Receiving land capture 115 is configured to mechanically hold one side of the bulb-shaped seal in place when engaged with the receiving land capture 115. In some examples, a strip of the bulb-shaped seal can be secured to a perimeter of an aircraft panel and a corresponding strip of the one-sided receiving land capture 115 can be secured to a perimeter of another aircraft panel, as described in more detail with regard to FIG. 4. The one-sided receiving land capture 115 can be applied as a strip that follows the outside perimeter of the aircraft panel in some examples such that the bulb-shaped seal snaps into place along its outer perimeter and is surrounded by a lip of the receiving land capture 115 when it is engaged. In other examples, the one-sided receiving land capture 115 can be installed such that the lip follows the inside perimeter so that the bulb-shaped seal snaps into place along its interior side and surrounds the receiving land capture 115 when it is engaged.

In the present embodiment, receiving land capture 115 can be made of a ferritic material, stainless steel, aluminum, magnetic materials, non-metallic materials, or other materials. In some examples, land capture 115 can include a magnetic material designed to attract materials included in the bulb-shaped seal. According to various examples, receiving land capture 115 is configured to elastically deform to allow the bulb-shaped seal to engage with receiving land capture 115, such that receiving land capture 115 can open to allow placement of the bulb-shaped seal and return substantially to its original shape to secure the bulb-shaped seal in place. According to various embodiments, in order to disengage the bulb-shaped seal from the receiving land capture 115, a force can be applied normal to the surfaces of aircraft panels 101 and/or 129 such that the bulb-shaped seal is pulled apart and released from the receiving land capture 115.

Figure 3:
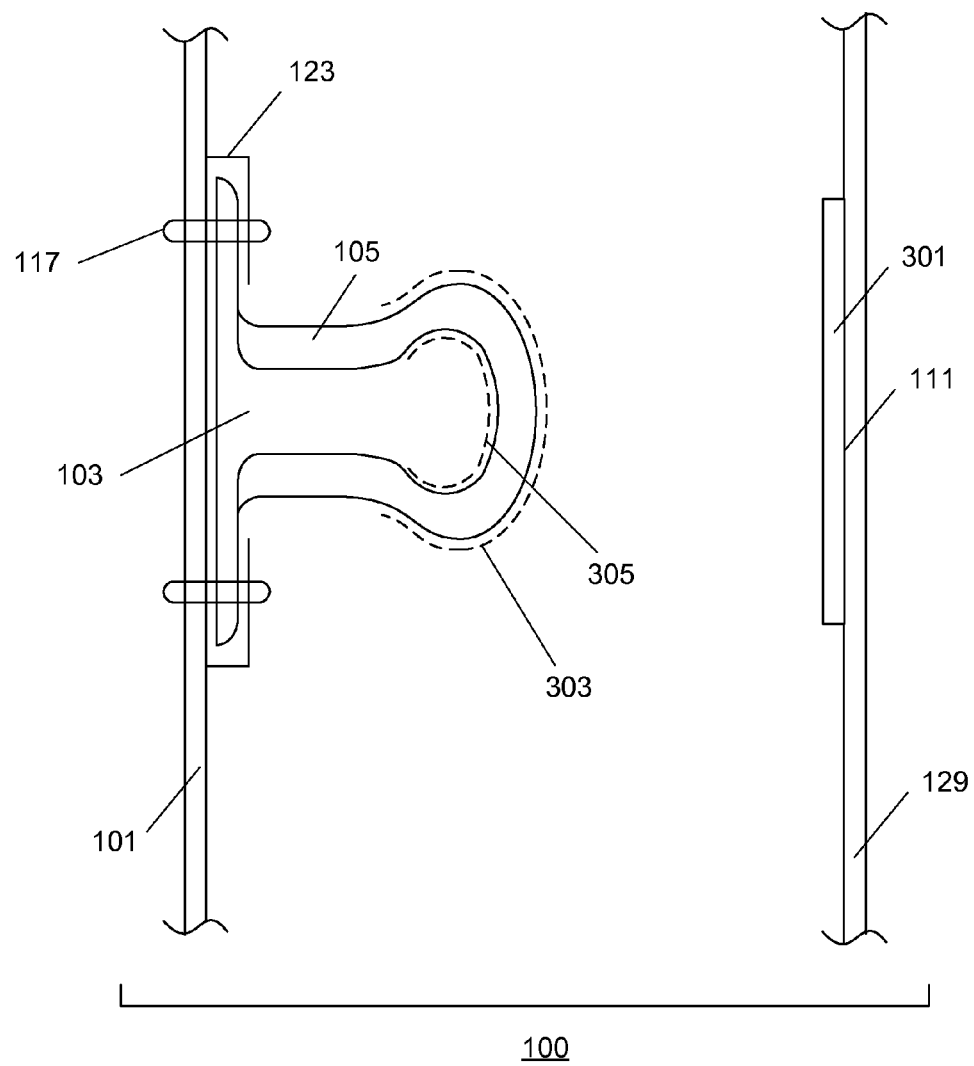
FIG. 3 is a cross-sectional view of a magnetic seal assembly with a magnetic seal, in accordance with various embodiments.

With reference to FIG. 3, shown is a cross-sectional view of a seal assembly with a magnetic seal, in accordance with various embodiments. In the present embodiment, the bulb-shaped seal includes bulb core 103, reinforcement layer 105, an inner magnetic layer 305 and an outer magnetic layer 303. The magnetic seal can be used in combination with a capture seal or in lieu of a capture seal. According to particular embodiments, the bulb-shaped seal is configured to elastically deform such that it can engage with a magnetic layer 303 and form a snug, secure fit. In particular embodiments, magnetic layer 301 and land 111 may also deform to form a snug, secure fit with the magnetic layers 303 and 305. In some examples, bulb core 103 can be hollow, and in other instances, bulb core 103 may include a closed cell rubber or silicone core or other materials. Reinforcement layer 105 can include materials such as ceramic fiber, glass fiber, metal, magnetic material or other non-metallic materials.

In the present embodiment, the bulb-shaped seal can be secured to the surface of an aircraft panel 101. For example, the bulb-shaped seal can be secured using a bracket 123 and fastener 117, or any other mechanism configured to attach the bulb-shaped seal to the surface of aircraft panel 101. As shown, the bulb-shaped seal is configured to engage with magnetic layer 301 and land 111, such that when the bulb-shaped seal and the receiving land are engaged, aircraft panel 101 is secured to aircraft panel 129. In some embodiments, magnetic layer 301 and land 111 can also deform to conform to the bulb-shaped seal when engaged.

According to various embodiments, land 111 is a location where the bulb-shaped seal makes contact with the surface of aircraft panel 129. In some examples, land 111 can also be made of a magnetic material.

Use of Seal Assembly

A seal assembly can be used to seal various features of vehicles and structures, according to various embodiments. In particular, a seal assembly can be used to seal portions of an airplane that may require sealing from the outside environment, outside environment, or between various sections of the aircraft. Additionally, a seal assembly can be used at numerous airplane joints at nacelles, pylons, access doors, panels, etc., that require the use of seals to prevent elements from entering and exiting an area through the joints.

Figure 4:
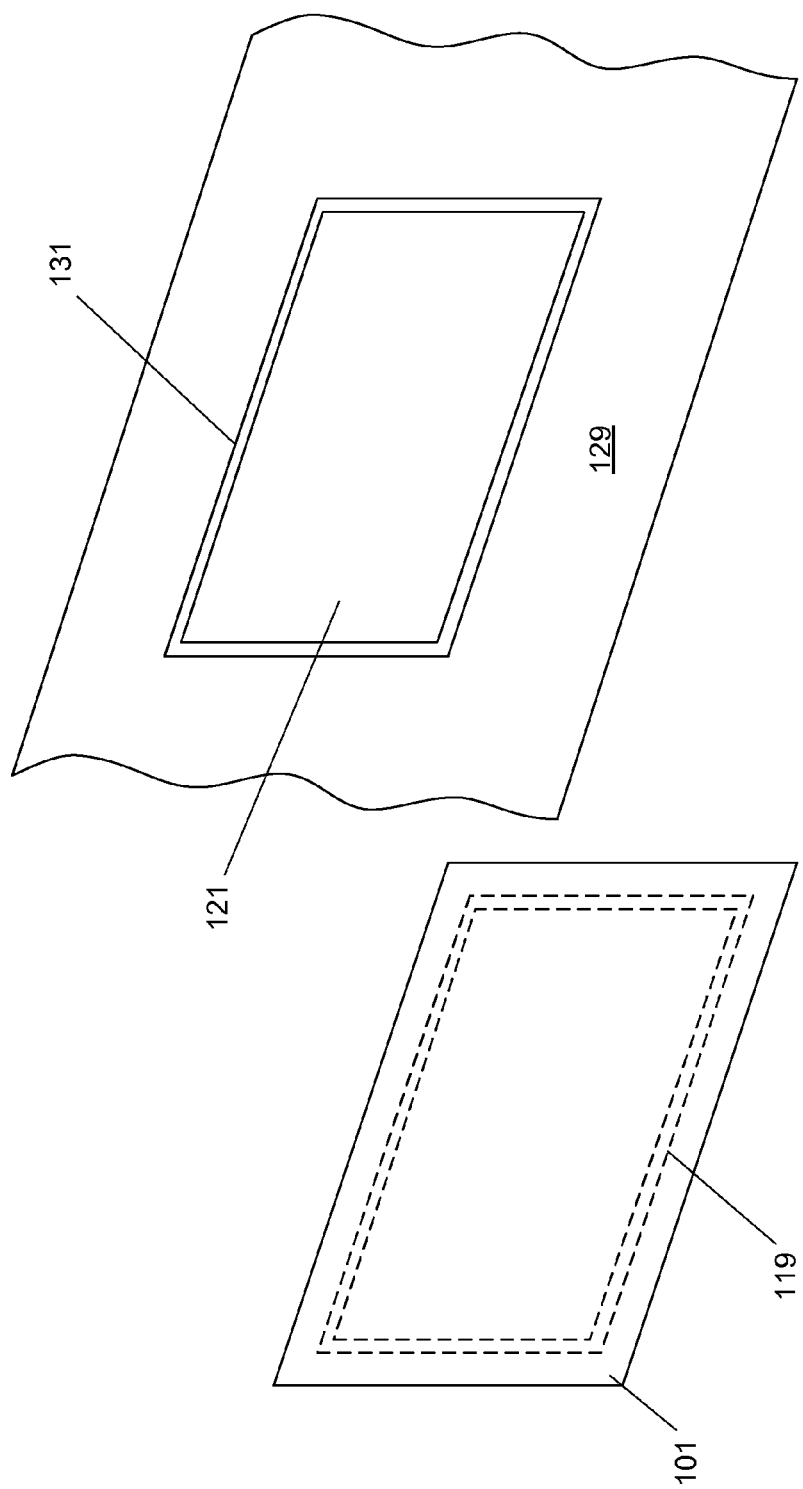
FIG. 4 is a diagrammatic representation of a captured seal used between two aircraft surfaces, in accordance with various embodiments.

With reference to FIG. 4, shown is a diagrammatic representation of a seal used between two aircraft surfaces, in accordance with various embodiments. As shown, aircraft panel 101 includes a bulb-shaped seal 119 secured along a perimeter of the aircraft panel 101. In particular, a strip of the bulb-shaped seal can be attached along the perimeter of aircraft panel 101. In some examples, parallel strips of the bulb-shaped seal and corresponding parallel strips of the receiving land capture can be secured in order to create an even stronger seal and less leakage. Although aircraft panel 101 is represented as a door in the present embodiment, aircraft panel can represent various structures of an airplane in other examples.

In the present embodiment, aircraft panel 129 includes an opening 121 such as a door, window, etc. Receiving land capture 131 is fixed along a perimeter of opening 121 and is configured to engage with bulb-shaped seal 119. In some examples, a two-sided receiving land capture can be used, as described in more detail above with regard to FIG. 1. In other examples, a one-sided receiving land capture can be used, as described above with regard to FIG. 2.

According to various examples in which a one-sided receiving land capture 131 is used, the one-sided receiving land capture 131 can include a lip that follows the outside perimeter of the opening 121 such that the bulb-shaped seal snaps into place along its outer perimeter and is surrounded by the receiving land capture 131 when it is engaged such that the bulb-shaped seal is exposed on the side of the opening 121. In other examples, the one-sided receiving land capture 131 can be installed such that the lip follows the inside perimeter so that the bulb-shaped seal snaps into place along its interior side and surrounds the receiving land capture 115 when it is engaged such that the one-sided receiving land capture 131 is exposed on the side of the opening 121.

In the present embodiment, aircraft panel 101 can be snapped into place by engaging bulb-shaped seal 119 with receiving land capture 131. For instance, aircraft panel 101 can be pushed with a force sufficient to engage the seal with the receiving land capture. To remove aircraft panel 101 from aircraft panel 129, a force can be applied normal to the panels such that the bulb-shaped seal 119 and receiving land capture 111 are physically pulled apart and disengaged. For instance, this force can be applied by pulling a handle, etc. that is attached to the outside of airplane panel 119, which is opposite from where the bulb-shaped seal is secured. As described above with regard to FIGS. 1 and 2, bulb-shaped seal 119 can be engaged mechanically with receiving land capture 131 in some examples. In addition, bulb-shaped seal 119 can also be magnetically engaged with receiving land capture 131 in other examples.

Figure 5:
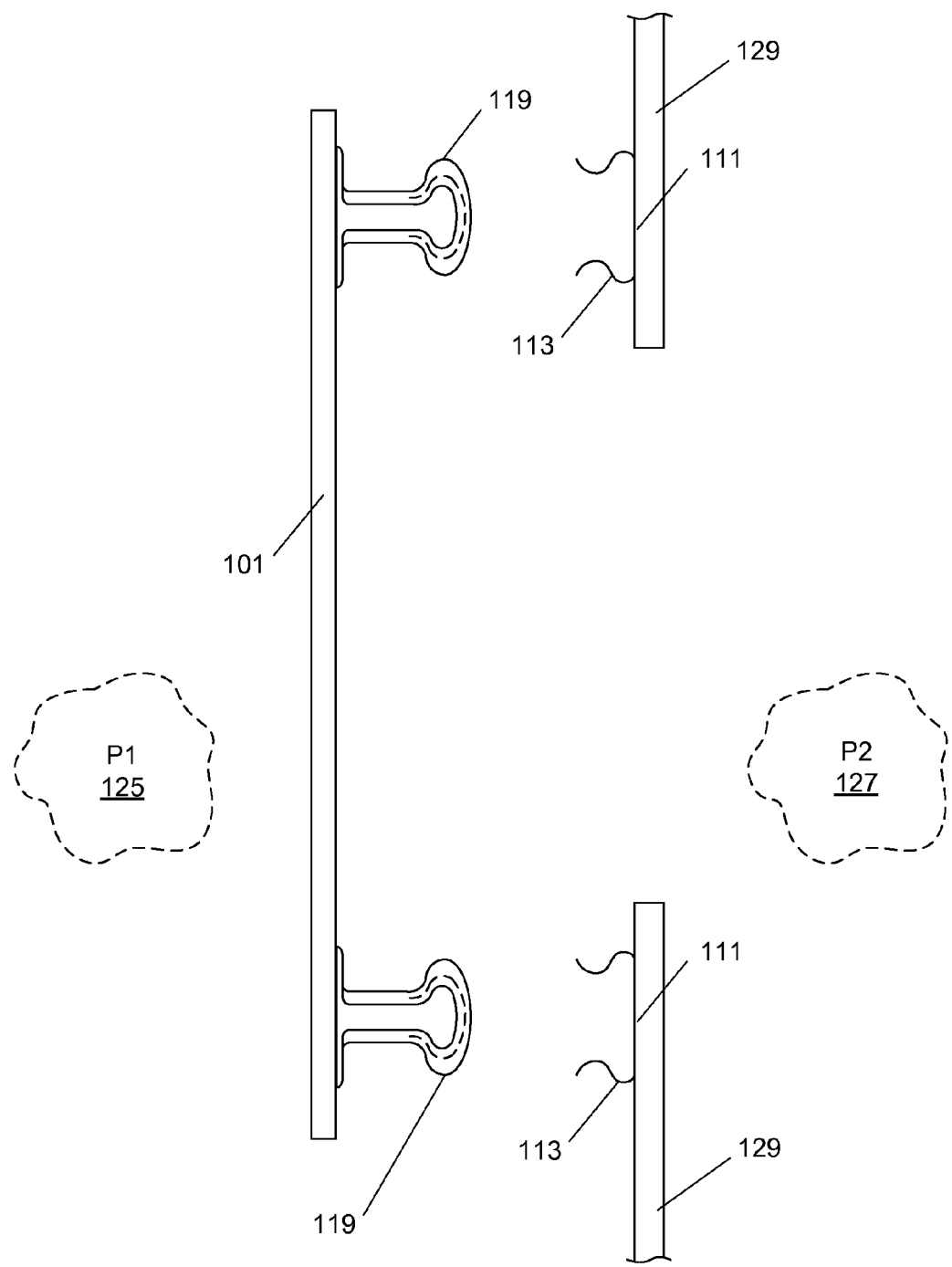
FIG. 5 is a cross-sectional view of a captured seal used to maintain a pressure differential between two regions, in accordance with various embodiments.

With reference to FIG. 5, shown is a cross-sectional view of a seal used to maintain a pressure differential between two regions, in accordance with various embodiments. In the present embodiment, aircraft panel 101 includes a strip of bulb-shaped seal 119 secured along a perimeter of the aircraft panel 101, which is shown in a cross-sectional view. As shown, aircraft panel 101 is configured as a door for an aircraft or cargo area. However, aircraft panel 101 can represent various structures of an airplane in other examples.

In the present embodiment, aircraft panel 129 includes an opening such as a door, window, etc. A receiving land capture 113 is fixed along a perimeter of the opening and is configured to engage with bulb-shaped seal 119. As shown in the present example, a two-sided receiving land capture can be used, although a one-sided receiving land capture can also be used in other examples.

In the present embodiment, aircraft panel 101 can be snapped into place by engaging bulb-shaped seal 119 with receiving land capture 113. For instance, aircraft panel 101 can be pushed with a physical force sufficient to engage the seal with the receiving land capture. To remove aircraft panel 101 from aircraft panel 129, a force can be applied normal to the panels such that the bulb-shaped seal 119 and receiving land capture 113 are physically pulled apart and disengaged. For instance, this force can be applied by pulling a handle, etc. that is attached to outside of airplane panel 101, on the side opposite from where the bulb-shaped seal is secured. As described above with regard to FIGS. 1 and 2, bulb-shaped seal 119 can be engaged mechanically with receiving land capture 113 in some examples. In addition, bulb-shaped seal 119 can also be magnetically engaged with receiving land capture 113 in other examples.

According to various embodiments, when the bulb-shaped seal 119 is engaged with receiving land capture 113, a seal is formed between aircraft panel 101 and aircraft panel 129. This seal separates two regions, region 125 and region 127. For instance, region 125 may be the outside atmosphere and region 127 may be a cargo interior of an airplane. In another example, region 125 may be the outside atmosphere and region 127 may be the fuselage of an airplane. In yet another example, region 125 may be an interior region of an airplane and region 127 may be another interior region of the airplane.

As described above, various embodiments of the seal assembly are configured to reduce leakage between regions 125 and 127. For instance, the seal created by the seal assembly can prevent air from leaking out of an aircraft into the environment, which can cause the aircraft to lose thrust. In another example, effective seals can reduce protruding surfaces caused by joints, doors, etc. that can produce drag forces, and thereby increase fuel consumption of an aircraft.

In the present embodiment, region 125 has a pressure P1 and region 127 has a pressure P2. According to various embodiments, region 125 and region 127 can have differential pressures, such that P1 and P2 have pressures that are distinct from each other. For example, for a cargo compartment door, the differential between P1 and P2 can be around 7.4 psi, where P1 is the pressure of outside environment, and P2 is the pressure of the cargo area. Of course, various differentials can exist between different regions of an aircraft or vehicle in other examples. In addition, the differential in pressure between the two regions can be negligible in some applications, such as when a seal separates two compartments having the same or about the same pressure.

When there is a differential in pressure between regions 125 and 127, any gaps in the seal between aircraft panel 101 and 129 can allow air to escape and cause issues such as drag forces and fuel inefficiencies. Various embodiments described above set forth an improved design for a seal assembly that provides an improved seal and reduces leakage and gaps between the panels. In addition, the seal assembly can maintain a pressure differential between different regions of an airplane, thereby increasing efficiencies of the aircraft.

Figure 6:
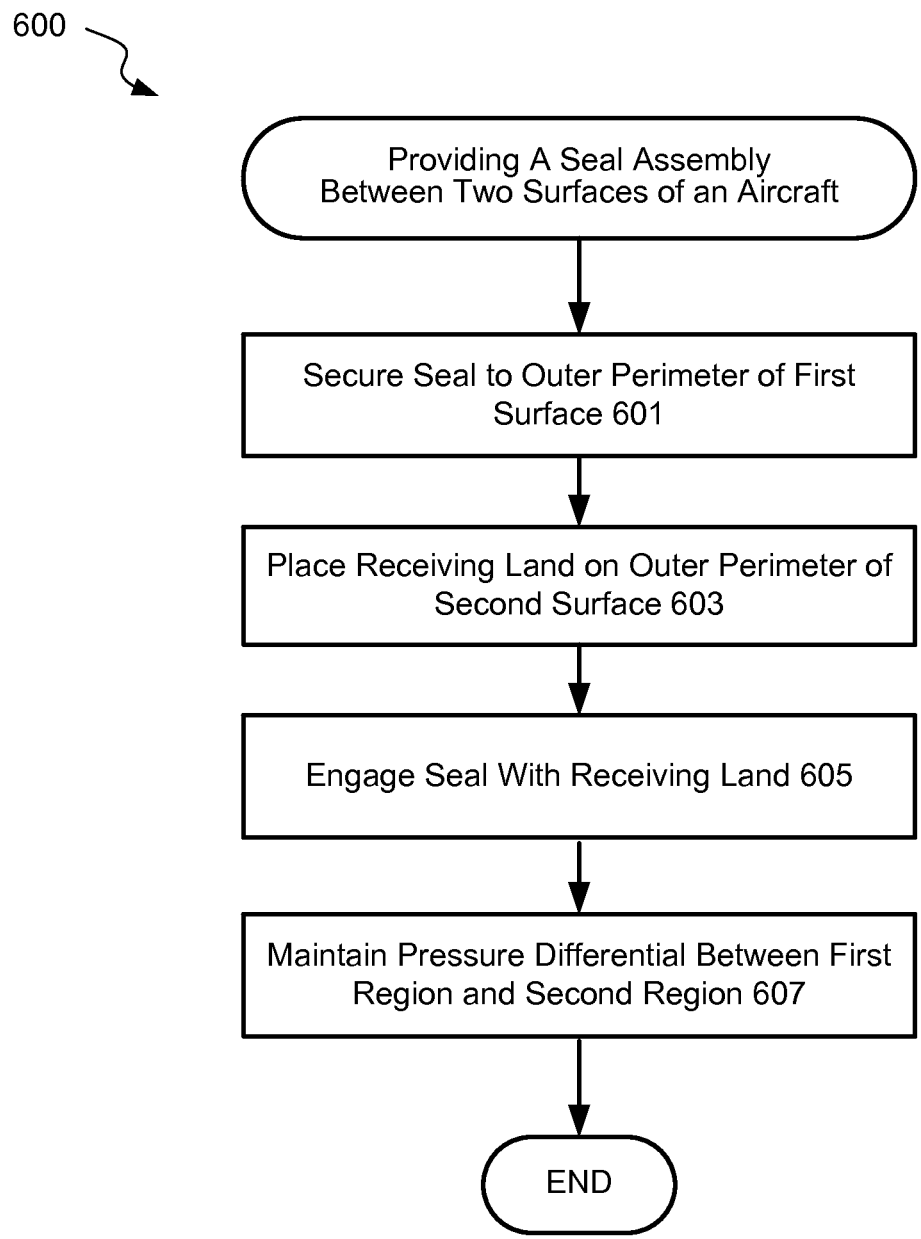
FIG. 6 is a flowchart illustrating a process for providing a captured seal assembly between two surfaces of an aircraft, in accordance with various embodiments.

According to various embodiments, installation of the seal assembly involves securing both the bulb-shaped seal and the corresponding receiving land capture, which is a more involved process than traditional seals that include installation of only a seal without a land capture. With reference to FIG. 6, shown is a flowchart illustrating a process for providing a seal assembly between two surfaces of an aircraft, in accordance with various embodiments. In particular, a strip of the bulb-shaped seal is secured to an outer perimeter of a first surface at 601. In some examples, one or more additional strips can be installed parallel to the strip of bulb-shaped seal such that they would form a double or reinforced seal to further reduce leakage and gaps in the seal.

Next, a corresponding receiving land capture is placed along an outer perimeter of a second surface at 603, such that engagement of the receiving land capture with the bulb-shaped seal joins the first and second surfaces. If more than one strip of the bulb-shaped seal is installed, corresponding strips of the receiving land capture can also be installed. Once the bulb-shaped seal and receiving land capture are installed, the bulb-shaped seal can be engaged with the receiving land capture at 605.

As described in more detail above, the bulb-shaped seal can be engaged with the receiving land capture by applying a physical force sufficient to snap the two sides together. Once the bulb-shaped seal and the receiving land capture are engaged, a seal is formed between the first and second surfaces, such that differences in pressure between a first region adjacent to the first surface and a second region adjacent to the second surface can be maintained at 607. For instance, if the first region is the outside atmosphere and the second region is a cargo area, the seal formed between the first and second surfaces can reduce leakage between these two regions, thereby maintaining the pressure differential between the two regions. In some examples, the first and second region can have the same or similar pressures, such as when the first surface and second surface separate two interior cargo areas. In these examples, maintaining the pressure differential can include reducing or preventing leakage between the two regions.

Examples of Aircraft

Figure 7A:
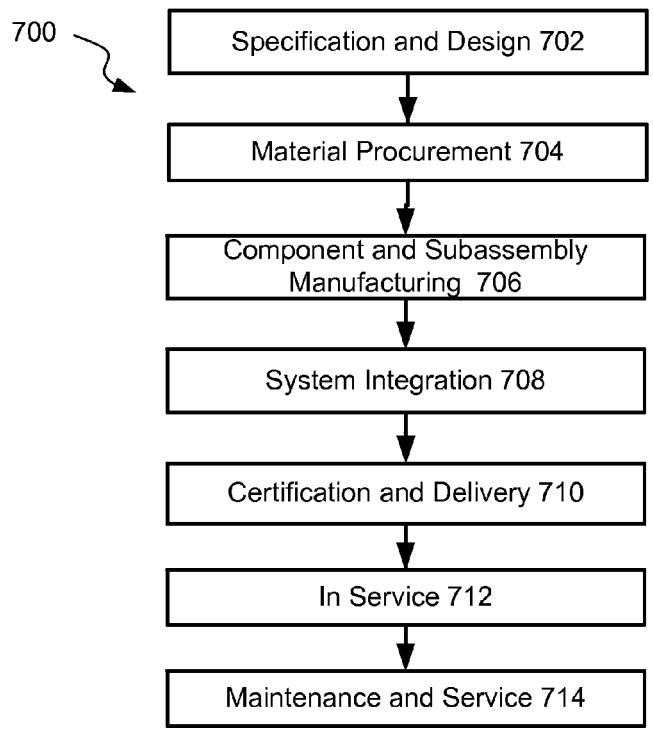
FIG. 7A is a process flowchart reflecting key operations in the life cycle of an aircraft from early stages of manufacturing to entering service, in accordance with various embodiments.

An aircraft manufacturing and service method 700 shown in FIG. 7A and an aircraft 730 shown in FIG. 7B will now be described to better illustrate various features of processes and systems presented herein. During pre-production, aircraft manufacturing and service method 700 may include specification and design 702 of aircraft 730 and material procurement 704. The production phase involves component and subassembly manufacturing 706 and system integration 708 of aircraft 730. Thereafter, aircraft 730 may go through certification and delivery 710 in order to be placed in service 712. While in service by a customer, aircraft 730 is scheduled for routine maintenance and service 714 (which may also include modification, reconfiguration, refurbishment, and so on). While the embodiments described herein relate generally to servicing of commercial aircraft, they may be practiced at other stages of the aircraft manufacturing and service method 700.

Each of the processes of aircraft manufacturing and service method 700 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

Figure 7B:
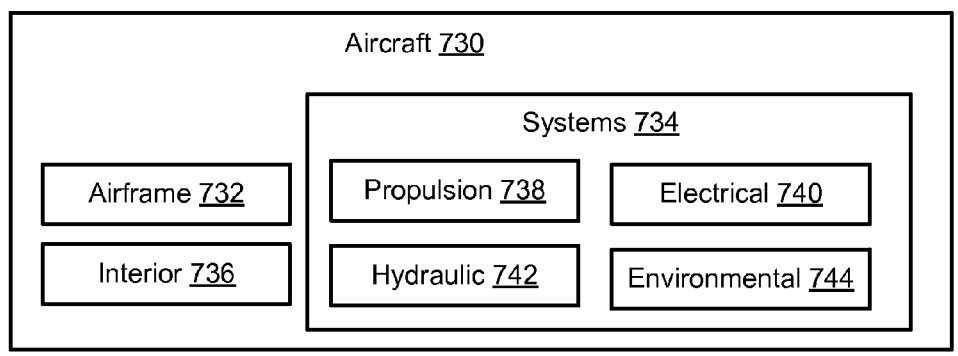
FIG. 7B is a block diagram illustrating various key components of an aircraft, in accordance with various embodiments.

As shown in FIG. 7B, aircraft 730 produced by aircraft manufacturing and service method 700 may include airframe 732, interior 736, and multiple systems 734. Examples of systems 734 include one or more of propulsion system 738, electrical system 740, hydraulic system 742, and environmental system 744. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 700. For example, without limitation, components or subassemblies corresponding to component and subassembly manufacturing 706 may be fabricated or manufactured in a manner similar to components or subassemblies produced while aircraft 730 is in service.

Also, one or more apparatus embodiments, method embodiments, or a combination thereof may be utilized during component and subassembly manufacturing 706 and system integration 708, for example, without limitation, by substantially expediting assembly of or reducing the cost of aircraft 730. Similarly, one or more of apparatus embodiments, method embodiments, or a combination thereof may be utilized while aircraft 730 is in service, for example, without limitation, to maintenance and service 714 may be used during system integration 708 and/or maintenance and service 714 to determine whether parts may be connected and/or mated to each other.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. An apparatus comprising:
a seal assembly for interposition between a first surface and a second surface,
the seal assembly comprising:
a seal secured to an outer perimeter of the first surface,
wherein the seal comprises two layers, the first layer being a core layer and the second layer being a stiffening layer disposed over the core layer,
wherein the stiffening layer comprises a magnetic material,
wherein both the core layer and the stiffening layer of the seal include a neck portion and a head portion, the neck portion being proximate to the first surface, the neck portion being narrower than the head portion, and
wherein the seal is elastically deformable;
a capture secured to an outer perimeter of the second surface,
wherein the shape of the capture is configured to be conforming to the shape of the seal such that a portion of the capture distal to the second surface is narrower than a portion of the capture proximate to the second surface, the capture being configured to form a snug and secure fit with the seal while engaged with the seal, wherein the portion of the capture distal to the second surface directly contacts the neck portion of the seal while the capture is engaged with the seal,
wherein the capture is further configured to elastically deform to allow both the core layer and the stiffening layer of the seal to be inserted into the capture, wherein the capture opens to allow placement of the seal and subsequently returns substantially to its original shape to secure the seal in place,
wherein the magnetic material in the stiffening layer magnetically attracts the capture.

2. The apparatus of claim 1, wherein the first surface is a first aircraft surface and the second surface is a second aircraft surface.

3. The apparatus of claim 2, wherein the first aircraft surface is part of a door, and wherein the second aircraft surface is formed by an opening configured for engaging with the door.

4. The apparatus of claim 1, wherein the capture engages two sides of the seal.

5. The apparatus of claim 1, wherein the capture engages a first side of the seal while a second side of the seal does not engage the receiving land capture, and wherein the first side of the seal is opposite to the second side of the seal.

6. The apparatus of claim 1, wherein the seal includes a reinforcement layer comprising one of ceramic fiber, glass fiber, metal, magnetic material, or non-metallic material.

7. The apparatus of claim 1, wherein the seal includes an embedded layer in between the first layer and the second layer.

8. The apparatus of claim 1, wherein the seal includes a stiffening material that is embedded in the seal.

9. The apparatus of claim 1, wherein the capture comprises one of a ferritic material, stainless steel, aluminum, magnetic material, or non-metallic material.

10. A seal assembly comprising:
a seal configured to be secured to an outer perimeter of a first surface wherein the seal comprises two layers, the first layer being a core layer and the second layer being a stiffening layer disposed over the core layer, wherein the stiffening layer comprises a magnetic material, wherein both the core layer and the stiffening layer of the seal include a neck portion and a head portion, the neck portion being proximate to the first surface, the neck portion being narrower than the head portion, and wherein the seal is elastically deformable; and
a capture configured to be secured to an outer perimeter of a second surface, wherein the shape of the capture is configured to be conforming to the shape of the seal such that a portion of the capture distal to the second surface is narrower than a portion of the capture proximate to the second surface, the capture being configured to form a snug and secure fit with the seal while engaged with the seal, wherein the capture is further configured to elastically deform to allow both the core layer and the stiffening layer of the seal to be inserted into the capture, wherein the capture opens to allow placement of the seal and subsequently returns substantially to its original shape to secure the seal in place, wherein the portion of the capture distal to the second surface directly contacts the neck portion of the seal while the capture is engaged with the seal, wherein the magnetic material in the stiffening layer magnetically attracts the capture.

11. The seal assembly of claim 10, wherein the first surface is a first aircraft surface and the second surface is a second aircraft surface.

12. The seal assembly of claim 10, wherein the capture engages two sides of the seal.

13. The seal assembly of claim 10, wherein the capture engages one side of the seal.

14. The seal assembly of claim 10, wherein the seal includes a reinforcement layer comprising one of ceramic fiber, glass fiber, metal, or non-metallic material.

15. The seal assembly of claim 10, wherein the seal can be disengaged from the capture by applying a force normal to the first surface.

16. A method comprising:
securing a seal to an outer perimeter of a first surface of an aircraft, wherein the seal comprises two layers, the first layer being a core layer and the second layer being a stiffening layer disposed over the core layer, wherein the stiffening layer comprises a magnetic material, wherein both the core layer and the stiffening layer of the seal include a neck portion and a head portion, the neck portion being proximate to the first surface, the neck portion being narrower than the head portion, and wherein the seal is elastically deformable;
placing a capture on a corresponding outer perimeter of a second surface of an aircraft;

engaging the seal with the capture, wherein the shape of the capture is configured to be conforming to the shape of the seal such that a portion of the capture distal to the second surface is narrower than a portion of the capture proximate to the second surface, the capture being further configured to form a snug and secure fit with the seal while engaged with the seal, wherein the capture is further configured to elastically deform to allow both the core layer and the stiffening layer of the seal to be inserted into the capture, wherein the capture opens to allow placement of the seal and subsequently returns substantially to its original shape to secure the seal in place, wherein the portion of the capture distal to the second surface directly contacts the neck portion of the seal while the capture is engaged with the seal, wherein the magnetic material in the stiffening layer magnetically attracts the capture.

17. The method of claim 16, wherein the second surface includes an opening, and wherein the first surface is configured to cover the opening.

18. The method of claim 16, wherein the seal includes a reinforcement layer comprising one of ceramic fiber, glass fiber, metal, or non-metallic material.

\* \* \* \* \*